US006271984B1

(12) United States Patent
Ogawa et al.

(10) Patent No.: US 6,271,984 B1
(45) **Date of Patent: *Aug. 7, 2001**

(54) RECORDING AND/OR REPRODUCING APPARATUS

(75) Inventors: Taizo Ogawa; Hirokazu Akino, both of Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,310

(22) Filed: Feb. 4, 1998

(30) Foreign Application Priority Data

Feb. 7, 1997 (JP) .................................................. 9-025496

(51) Int. Cl.[7] .................................................. G11B 15/00
(52) U.S. Cl. ............................................ 360/93; 360/96.5
(58) Field of Search ...................................... 360/93, 96.5

(56) References Cited

U.S. PATENT DOCUMENTS

| | | | | |
|---|---|---|---|---|
| 3,991,369 | * | 11/1976 | Fujimoto | 360/93 |
| 4,445,159 | * | 4/1984 | Nemoto et al. | 360/93 |
| 4,587,583 | * | 5/1986 | Tomita | 360/93 |
| 4,593,331 | * | 6/1986 | Tomita | 360/93 |
| 5,414,573 | * | 5/1995 | Koga et al. | 360/93 |
| 5,764,433 | * | 6/1998 | Hanzawa et al. | 360/93 |

* cited by examiner

*Primary Examiner*—Allen T. Cao
(74) *Attorney, Agent, or Firm*—Oblon, Spivak, McClelland, Maier & Neustadt, P.C.

(57) ABSTRACT

A recording and/or reproducing apparatus including a body having a loading portion, in which a recording medium is accommodated, and a drive portion for recording and/or reproducing the recording medium; a cover joined to the body in such a manner that the cover can be opened/closed so that the loading portion is closed; and a reflecting surface formed on the outer surface of the cover so that the face or the like of a user is always reflected.

9 Claims, 6 Drawing Sheets

20 34 36 35 33 22d 22e 22b 43 21 22c 39 40 36 44 41 45 37 38 22 42 24

23
47
51
46
49
65
52
63
64
61
48
62
66
62
68
75
67
75
71
69
71
73
72

RECORDING AND/OR REPRODUCING APPARATUS

BACKGROUND OF THE INVENTION

1. Field of the Invention

The present invention relates to a portable recording and/or reproducing apparatus having a function capable of recording an information signal, such as an audio signal or a video signal, on a recording medium which is a tape cassette or a disk cartridge and/or reproducing the information signal from the same.

2. Description of Prior Art

Apparatuses for recording and/or reproducing a recording medium, such as a tape cassette or a disk cartridge, include small recording and/or reproducing apparatuses exhibiting excellent portability because of the small size which is somewhat larger than the size of the recording medium. For example, a recording and/or reproducing apparatus adaptable to the tape cassette as the recording medium has a body having a loading portion which accommodates the tape cassette so as to record or reproducing an information signal. Moreover, the recording and/or reproduce apparatus has a cover rotatively supported by the body so as to close the loading portion. The loading portion has a capstan for moving a magnetic tape, a pinch roller for pressing the magnetic tape against the capstan and a magnetic head for performing a recording and/or reproducing operation using the moving magnetic tape.

A portion of the above-mentioned recording and/or reproducing apparatuses has a radio receiving function. The foregoing recording and/or reproducing apparatus has a printed circuit board, in which a radio receiving circuit is formed, and an antenna on the reverse side of the cover. The recording and/or reproducing apparatus has the structure that the printed circuit board, in which the radio receiving circuit, and the antenna are provided for the cover so as to be disposed apart from metal elements, for example, the capstan. Thus, deterioration in the sensitivity for receiving radio waves can be prevented.

However, the portable recording and/or reproducing apparatuses each having the size which permits a user to easily carry the apparatus with one hand suffer from unsatisfactory aesthetic sense. Thus, a user does not want to usually carry the conventional recording and/or reproducing apparatus.

OBJECT AND SUMMARY OF THE INVENTION

Accordingly, an object of the present invention is to provide a recording and/or reproducing apparatus having satisfactorily small size so as to always be carried and convenient for a female user to carry the apparatus.

To achieve the above-mentioned object, according to one aspect of the present invention, there is provided a recording and/or reproducing apparatus including a body having a portion into which a recording medium, that is, a tape cassette is loaded with which recording/reproducing is performed, a cover rotatively joined to the body so as to be capable of closing the loading portion and a reflecting surface, that is, a mirror provided for the cover.

Other objects, features and advantages of the invention will be evident from the following detailed description of the preferred embodiments described in conjunction with the attached drawings.

DETAILED DESCRIPTION OF THE INVENTION

An embodiment of a recording and/or reproducing apparatus according to the present invention will now be described with reference to the drawings. The recording and/or reproducing apparatus according to the present invention is applied to a portable, that is, small size, tape player apparatus adaptable to a tape cassette which serves as a recording medium and in which audio signals are recorded, the tape player apparatus having a radio receiving function.

Figure 1:
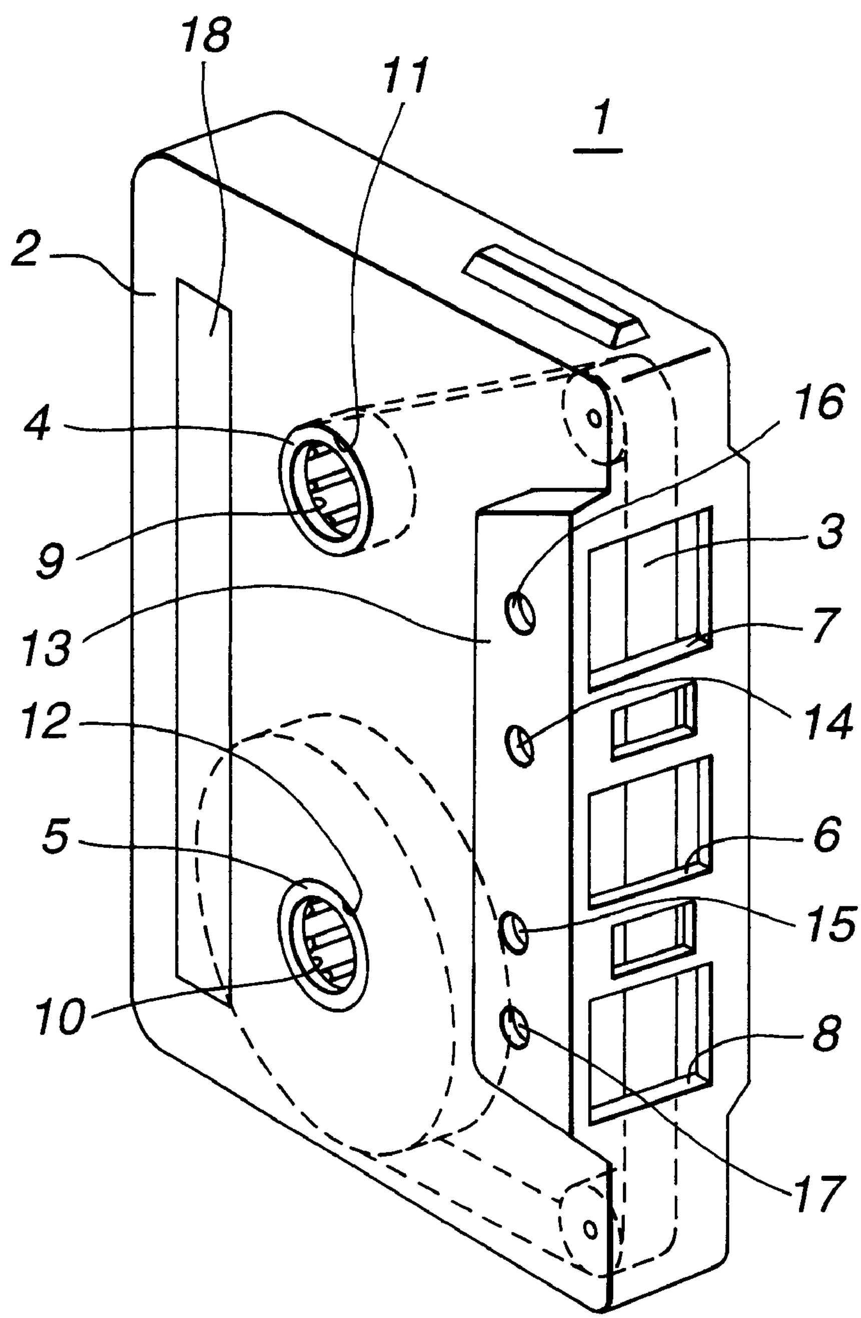
FIG. 1 is a perspective view showing the overall body of a tape cassette adaptable to a tape player apparatus according to an embodiment of the present invention.

As shown in FIG. 1, a tape cassette 1 for use in the tape player apparatus has a structure that a pair of tape reels 4 and 5, around which a magnetic tape 3 is wound, are rotatively accommodated in a body 2 of the tape cassette 1 made of synthetic resin and formed to have a rectangular main surface. In the body 2 of the tape cassette 1, the magnetic tape 3 extending from either of the tape reels 4 and 5 faces the front surface of the tape cassette 1. Specifically, the body 2 of the tape cassette 1 has, in the front surface thereof, an opening 6 through which a magnetic head unit serving as a recording and/or reproducing mechanism is introduced. Moreover, openings 7 and 8 through which pinch rollers (not shown) are introduced are formed in the front surface of the body 2 of the tape cassette 1. Thus, the magnetic tape 3 is exposed to the outside.

Moreover, the main surface of the body 2 of the tape cassette 1 has reel-shaft insertion openings 11 and 12 through which reel-shaft openings 9 and 10 are exposed to the outside. The reel-shaft openings 9 and 10 are openings provided for the tape reels 4 and 5 so as to receive a tape-reel drive mechanism. In addition, a trapezoidal projection 13 is formed on the front portion of the main surface of the body 2 of the tape cassette 1. The projection 13 has locating openings 14 and 15 formed along the front portion of the body 2 of the tape cassette 1 so that the body 2 of the tape cassette 1 is located with pins. Openings 16 and 17 through which the shafts of the capstans are introduced are formed on the outside of the locating openings 14 and 15. The body 2 of the tape cassette 1 has an indication seal 18 applied to the rear surface of the main surface thereof. The indication seal 18 is a seal on which, for example, the title of audio data recorded on the magnetic tape 3 is written so that a user recognizes the contents of recorded audio data.

Figure 2:
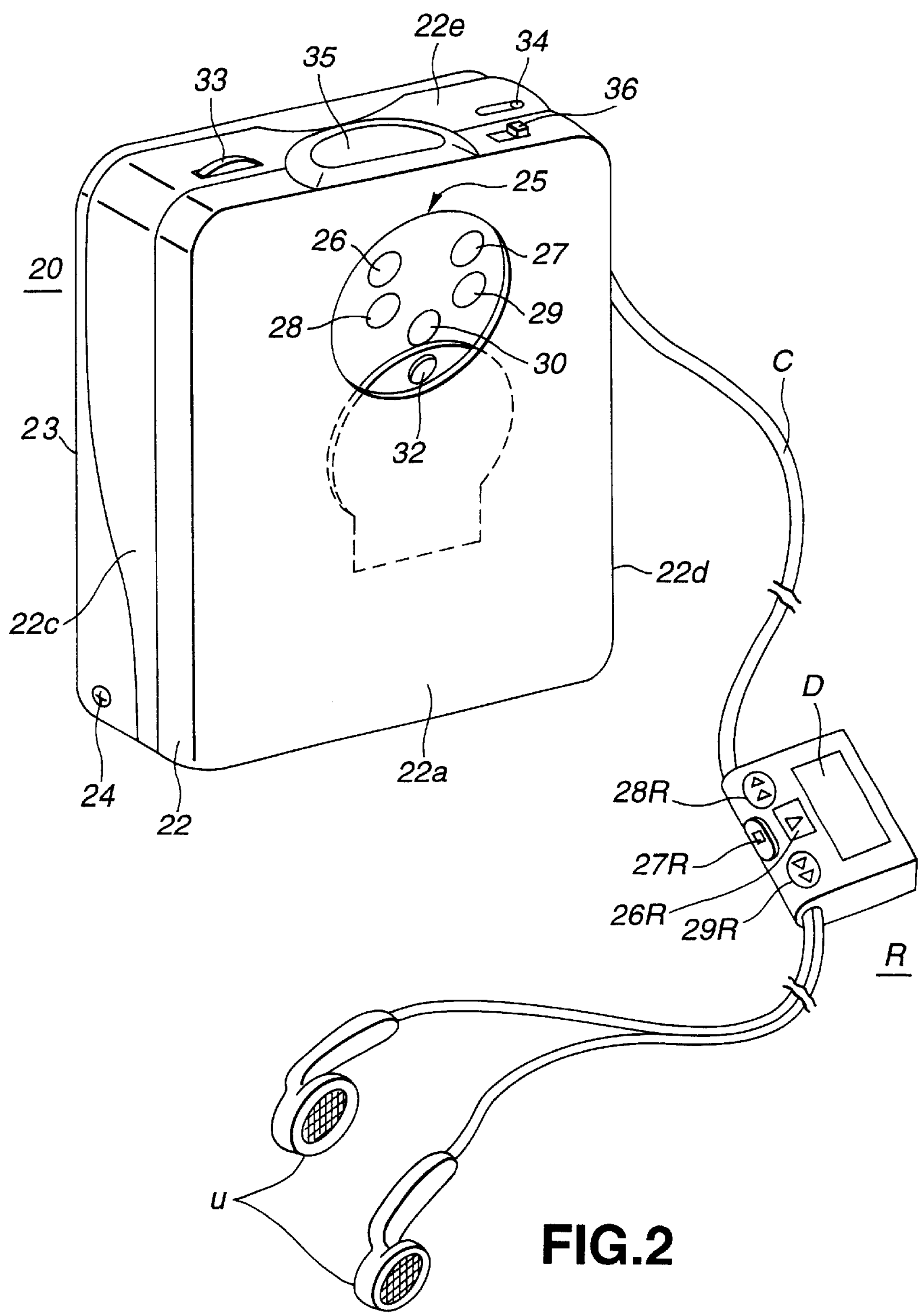
FIG. 2 is a perspective view showing the overall body of the tape player apparatus when viewed from a position adjacent to the body of the tape player apparatus.
Figure 3:
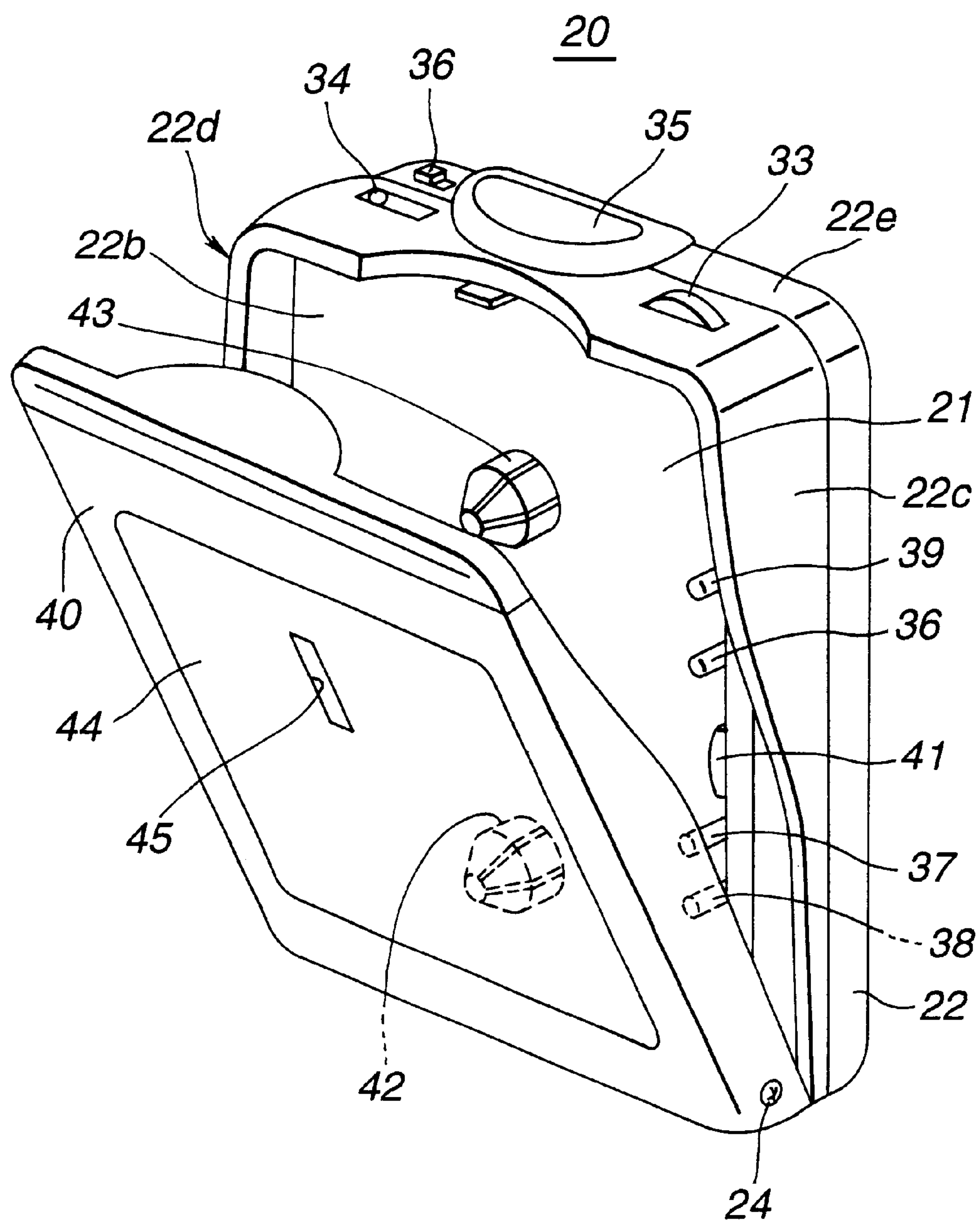
FIG. 3 is a perspective view showing the overall body of the tape player apparatus in a state in which a cover of the tape player apparatus has been closed.
Figure 4:
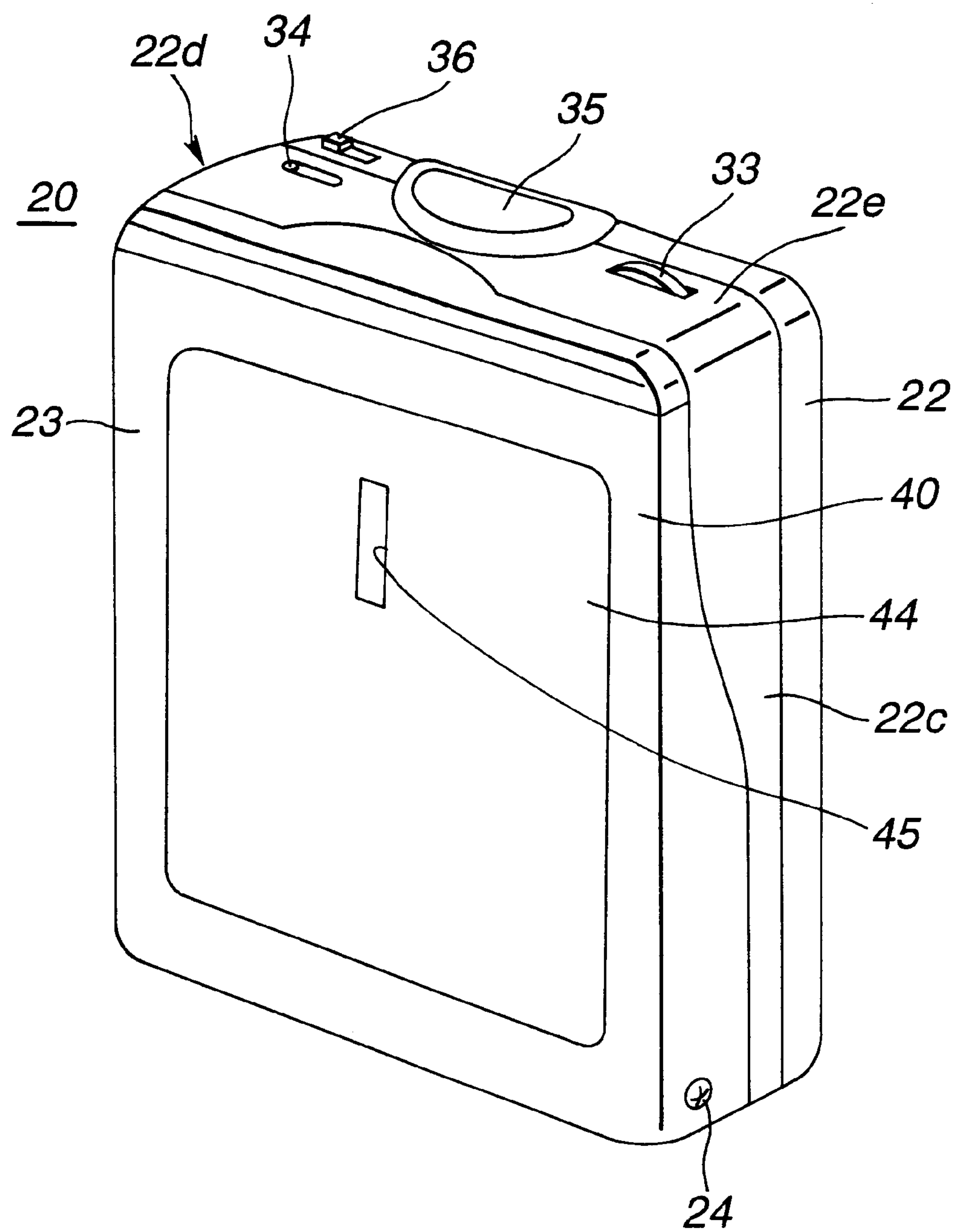
FIG. 4 is a perspective view showing the tape player apparatus when viewed from a position adjacent to the cover.

A tape player apparatus 20 in which the tape cassette 1 is used, as shown in FIGS. 2 to 4, includes a body 22 having a loading portion 21 into which the magnetic tape 3 is loaded, the magnetic tape 3 being accommodated in the tape cassette 1 which is inserted in such a manner that the shorter side of the tape cassette 1 is inserted. Thus, the recording and/or reproducing operation using the magnetic tape 3 is performed in the loading portion 21. The tape player apparatus 20 further includes a cover 23 rotatively joined to the body 22 in such a manner that the cover 23 is able to close the loading portion 21. The cover 23 is joined to the body 22 with screws 24 which are inserted into right and left surfaces 22*d* and 22*c* of the body 22 so that the cover 23 is opened/closed by using the screws 24 as centers of rotation. Moreover, the tape player apparatus 20 has a synthesizer-type AM/FM radio receiving function.

A headphone jack (not shown) is formed in the right-hand side surface 22*d*. A headphone plug (not shown) is inserted into the headphone jack so as to be connected to the same. Headphone units for converting right and left stereo audio signals into a sound through a headphone cord C are provided.

A remote-control portion R having an LCD portion D is provided at an intermediate position of the headphone cord C. The functions of the tape cassette 1 in the tape player apparatus 20 including playback, stop, fast-forward movement and rewinding movement are displayed on the LCD portion D. Moreover, the frequency of a received radio wave is displayed on the LCD portion D.

As shown in FIG. 2, the body 22 has a case made of a metal material, such as aluminum (Al), titanium (Ti) or the like, the case being formed into a rectangular parallelepiped having a size somewhat larger than that of the tape cassette 1. The body 22 has an operation portion 25 on the surface thereof opposite to the surface on which the cover 23 is provided. The operation portion 25 is composed of a plurality of depression buttons which are a playback button 26 for reproducing an audio signal recorded in the tape cassette 1; a stop button 27 for stopping the reproduction operation; a fast-forward-movement button 28 for fast-forward-moving the magnetic tape 3; and a rewinding button 29 for rewinding the magnetic tape 3. Moreover, the operation portion 25 has a band-selection button 30 for selecting an AM/FM band. When any one of the operation buttons 26 to 30 is depressed, a corresponding diaphragm switch provided for a printed circuit board disposed in the body 22 is depressed.

Also the remote-control portion R has a playback button 26R for reproducing an audio signal recorded in the tape cassette 1; a stop button 27R for stopping the reproduction operation; a fast-forward-movement button 28R for fast-forward-moving the magnetic tape 3; and a rewinding button 29R for rewinding the magnetic tape 3. When a radio program is received, the fast-forward-movement button 28R also serves as a frequency-ascending button for raising the frequency of the radio wave in predetermined steps. The rewinding button 29R also serves as a frequency-descending button for decreasing the frequency.

A slidable shutter 32 is joined to the operation portion 25 in such a manner that the operation portion 25 is closed when any one of operation buttons 26 to 30 is not used. Therefore, the shutter 32 is opened only when a user requires to operate the tape player apparatus 20. Thus, the shutter 32 prevents an improper operation which occurs because of the contact of any one of the operation buttons 25 to 29 with another object when the tape player apparatus 20 is accommodated in a bag or the like. An upper surface 22*e* of the body 22 has a volume adjustment dial 33 for adjusting sound volume, a selection switch button 34 for selecting the radio receiving portion or the tape player apparatus, a cover-opening button 35 for opening the cover 23 and a power on/off button 36.

As shown in FIG. 3, the loading portion 21 is formed in the reverse side portion 22*b* of the body 22 opposite to the right-side portion 22*a* of the body 22. The tape cassette 1 is located and loaded into the loading portion 21 so that audio data recorded on the magnetic tape 3 accommodated in the tape cassette 1 is reproduced. That is, the loading portion 21 has reel shafts 41 and 42 which are inserted into the reel-shaft openings 9 and 10 formed in the tape cassette 1; locating pins 36 and 37 which are inserted into the locating openings 14 and 15; capstan shafts 38 and 39 which are inserted into the openings 16 and 17 for the shafts of the capstan; the magnetic head unit 41; and pinch rollers (not shown) which are inserted into the openings 7 and 8 for the pinch roller. As a matter of course, the body 22 includes the capstans, motors for rotating the reel shafts 41 and 42, and a battery which is a power source ((not shown). Also electric circuits for an amplifier for the headphone and the like are provided for the body 22.

When the tape cassette 1 has been loaded into the loading portion 21, tape reels 4 and 5 in which the reel shafts 41 and 42 are inserted into the reel-shaft openings 9 and 10 are rotated. Moreover, the locating pins 36 and 37 are inserted into the locating openings 14 and 15. As a result, the capstan shafts 38 and 39 are introduced into the reverse side of the magnetic tape 3 through the openings 16 and 17 for the shafts of the capstans. The pinch rollers are introduced into the openings 7 and 8 so that the magnetic tape 3 is held between the pinch rollers and the capstan shafts 38 and 39. In synchronization with this, the magnetic head unit 41 is introduced through the opening 6 so that audio data is recorded on the magnetic tape 3 or reproduced from the same.

As shown in FIGS. 3 and 4, the cover 23 rotatively supported by the body 22 has a frame 40 made of synthetic resin and formed in the periphery of the cover 23; a mirror portion 44 formed into a reflecting surface in a region surrounded by the frame 40; and a window portion 45 disposed in the central portion of the mirror portion 44 and arranged to serve as both of a reflecting surface and a half mirror through which a user is able to see the loading portion 21 from predetermined angles of observation. The window portion 45 permits a user to recognize the residual quantity of the magnetic tape 3 wound between the tape reels 4 and 5.

Figure 5:
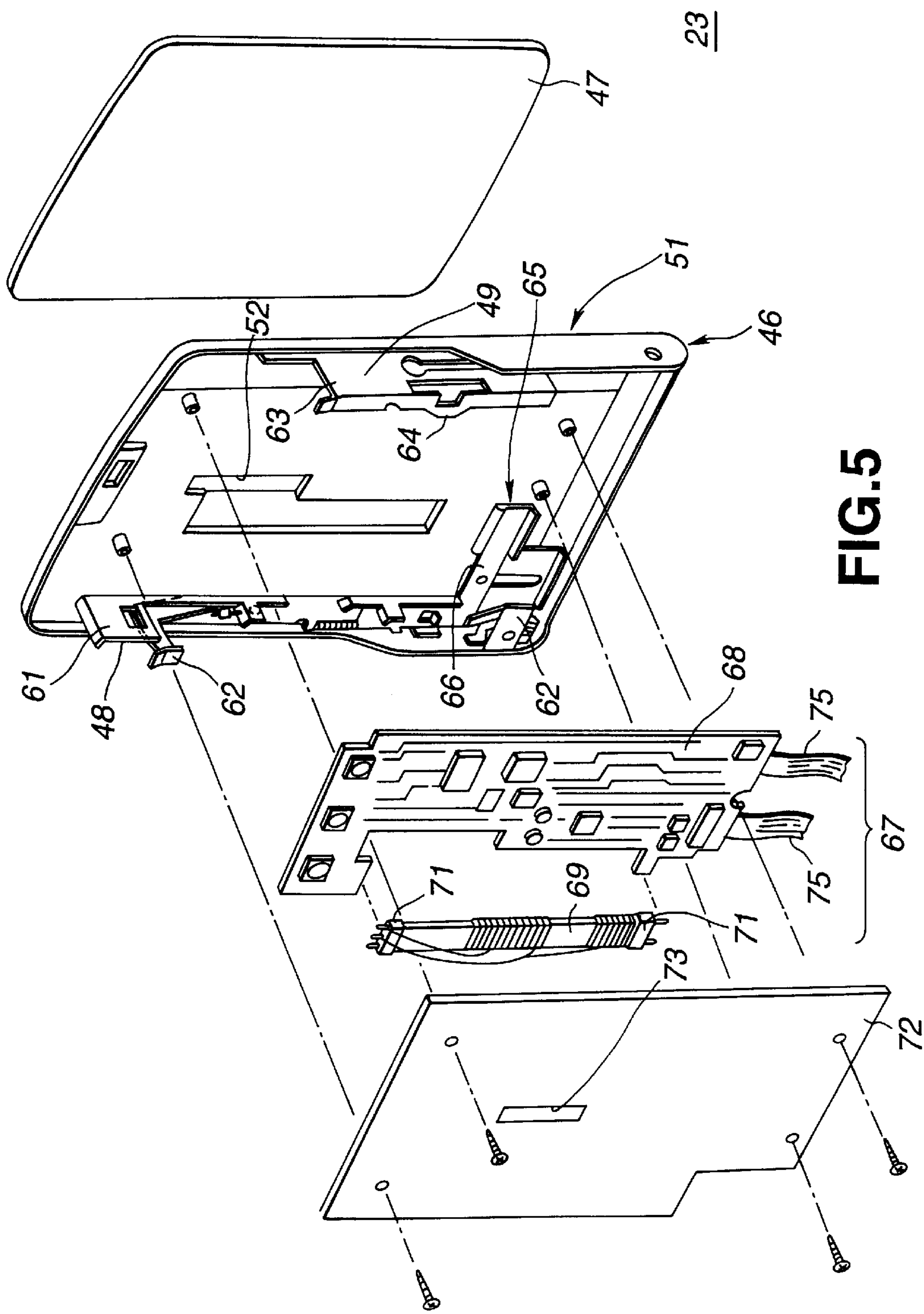
FIG. 5 is an exploded perspective view showing the cover.

As shown in FIG. 5, the cover 23 includes a body 46 serving as a base of the cover 23; a reflecting plate 47 joined to the outer surface of the body 46 and arranged to serve as a main portion of the cover 23; a first holding portion 48 joined adjacent to the loading portion 21 and arranged to hold the front surface of the tape cassette 1; a second holding portion 49 joined to the internal side of the body 46 of the cover 23 and arranged to hold the rear side of the tape cassette 1; and an ejecting mechanism 65 for ejecting the tape cassette 1 when the cover 23 has been opened.

The body 46 of the cover 23 serves as the base of the cover 23, as shown in FIG. 5. The body 46 of the cover 23 is made of synthetic resin and arranged to have the same size as that of the right-side portion 22*a* of the body 22. The body 46 of the cover 23 has a mount portion 51 formed into a recess for receiving the reflecting plate 47. An opening 52 for forming the window portion 45, through which the loading portion 21 is observed, is formed in substantially the central portion of the mount portion 51.

Figure 6:
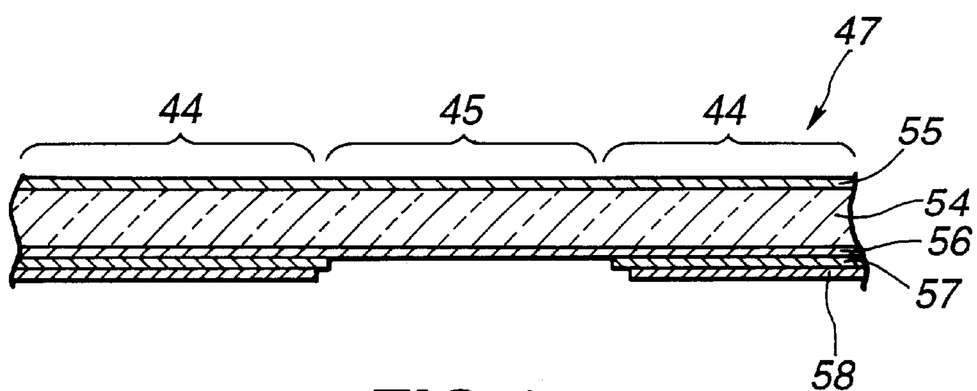
FIG. 6 is a cross sectional view showing an essential portion of a reflecting plate which is joined to the body of the cover.

As shown in FIG. 6, the reflecting plate 47 includes a base 54 formed to have a size which is substantially the same as that of the mount portion 51 and made of semi-transparent synthetic resin, such as acryl; and a hard-coat layer 55 formed on the outer surface of the base 54 and made of a coating material prepared by mixing additives with an acrylic resin material so as to prevent the base 54 from being damaged. The reflecting plate 47 further includes a reflecting layer 56 formed on the mount surface of the mount portion 51 of the base 54 by evaporation of a metal material, for example, titanium Ti) satisfactorily permitting transmission of radio waves. Moreover, the reflecting plate 47 includes a shielding layer 57 formed on the surface of the reflecting layer 56 by silk-printing a material obtained by mixing a coating with an acrylic resin material in order to shield incidental light. In addition, the reflecting plate 47 includes a bonding layer 58 for joining the base 54 to the mount portion 51 of the body 46. The reflecting layer 56 has a thickness, for example, about 30 Å to 300 Å (60 Å in this embodiment) which is smaller than a usual thickness for a mirror. Since the reflecting layer 56 made of titanium is formed by the evaporation, the manufacturing process can be simplified as compared with a method of forming the reflecting layer by plating.

The shielding layer 57 and the bonding layer 58 are not formed in the portion corresponding to the window portion 45. That is, the portion in which the shielding layer 57 and the bonding layer 58 are formed constitutes the mirror portion 44, while the portion in which the shielding layer 57 and the bonding layer 58 are not formed constitutes the window portion 45. The window portion 45 has the structure that the shielding layer 57 is not formed and the reflecting layer 56 has a thickness which is smaller than that of a usual mirror. Thus, the window portion 45 permits a user to observe the tape cassette 1 loaded into the loading portion 21 when the window portion 45 is observed from predetermined angles of observation. The window portion 45 serves as the reflecting surface when it is observed from other angles. Thus, the window portion 45 is formed into the so-called half mirror surface. Thus, the cover 23 exhibits excellent appearance and permits a variety of designs to be employed. Since the cover 23 serves as the mirror, the functions of the apparatus can be increased.

As shown in FIG. 5, the first holding portion 48 is joined to one of the end portions of the body 46 of the cover 23 in the lengthwise direction of the same. The main surface of the first holding portion 48 is secured to the inner surface of the body 46 of the cover 23 with an adhesive or the like. A plurality of projections 61 formed to project over the main surface of the body 46 of the cover 23 in a substantially perpendicular direction and arranged to constitute the first holding portion 48 serve as restraining portions for restraining lateral displacement of the tape cassette 1. Moreover, the projections 61 have a support portions 62 formed to substantially run parallel to the main surface of the body 46 of the cover 23. The support portions 62 is brought into contact with the main surface of the front surface of the tape cassette 1 so that the front surface of the tape cassette 1 is supported when the cover 23 has been opened.

The second holding portion 49 is joined to another end portion of the body 46 in the lengthwise direction of the same. The main surface of the second holding portion 49 is secured to the inner surface of the body 46 of the cover 23 with an adhesive or the like. A plurality of projections 63 formed to project over the main surface of the body 46 of the cover 23 in a substantially perpendicular direction and arranged to constitute the second holding portion 49 serve as a restraining portion together with the projections 61 of the first holding portion 48 for restraining a lateral displacement of the tape cassette 1. The projections 63 have a support portion 64 formed to substantially run parallel to the main surface of the body 46 of the cover 23. The support portion 64 is brought into contact with the main surface of the rear side of the tape cassette 1 so that the rear surface of the tape cassette 1 is supported when the cover 23 has been opened.

The ejecting mechanism 65 is, as shown in FIG. 5, joined to a back portion of the first holding portion 48. The ejecting mechanism 65 has an ejecting member 66 for sliding the tape cassette 1. When the ejecting member 66 pushes the tape cassette 1 from the back portion of the body 46 of the cover 23 toward outside, the ejecting operation is performed.

As described above, the cover 23 has the structure that the first and second holding portions 48 and 49 are joined to the body 46 of the cover 23. Moreover, the ejecting mechanism 65 is joined to the first holding portion 48. Therefore, a necessity of providing a cassette holder individually from the cover 23 can be eliminated. As a result, the thickness and weight of the cover 23 can be reduced. Moreover, the overall size of the apparatus can be reduced.

A radio-receiving portion 67 is provided for the reverse side of the cover 23. The radio-receiving portion 67 includes a printed circuit board 68, in which a radio receiving circuit is formed, and a bar-antenna 69 for receiving AM waves, as shown in FIG. 5. The radio receiving circuit formed on the printed circuit board 68 includes a tuning circuit, an intermediate-wave amplifying circuit, a wave detection circuit, a stereo demodulation circuit and the like. The bar-antenna 69 is formed into a thin flat plate having a rectangular shape. The bar-antenna 69 has holders 71 at two ends of the bar-antenna 69 in the direction of the shorter side of the bar-antenna 69. Thus, the bar-antenna 69 is, through the holders 71, secured and joined to the reverse side of the body 46 of the cover 23, the bar-antenna 69 being joined to a position adjacent to the window portion 45. The printed circuit board 68 and the bar-antenna 69 joined to the reverse side of the body 46 of the cover 23 are closed by a closing plate 72. Also the closing plate 72 has an opening 73 at a position corresponding to the window portion 45 so that the window portion 45 is not closed by the closing plate 72.

That is, the radio-receiving portion 67 is formed in a region on the reverse side of the body 46 of the cover 23, the region corresponding to the mirror portion 44 of the body 46 of the cover 23. Thus, the radio-receiving portion 67 cannot be observed through the window portion 45. Since the mirror portion 44 has the shielding layer 57, the radio-receiving portion 67 cannot be observed from the outside of the apparatus. Thus, deterioration in the appearance of the apparatus can be prevented. Since the printed circuit board 68 and the bar-antenna 69 are closed by the closing plate 72 even in a state in which the cover 23 has been closed, deterioration in the appearance can be prevented. Since the radio-receiving portion 67 is provided for the cover 23 with which the recording and/or reproducing mechanism is not provided, the space usage efficiency can be improved. Moreover, undesirable enlargement of the size of the body 22 can be prevented. Since the radio-receiving portion 67 is not provided for the body portion in which a multiplicity of metal elements for the recording and/or reproducing system are provided, the radio-wave receiving characteristic can be improved. Since the cover 23 is formed by stacking the body 46 of the cover 23, the reflecting plate 47, the printed circuit board 68 and the closing plate 72, the mechanical strength can be increased.

Figure 7:
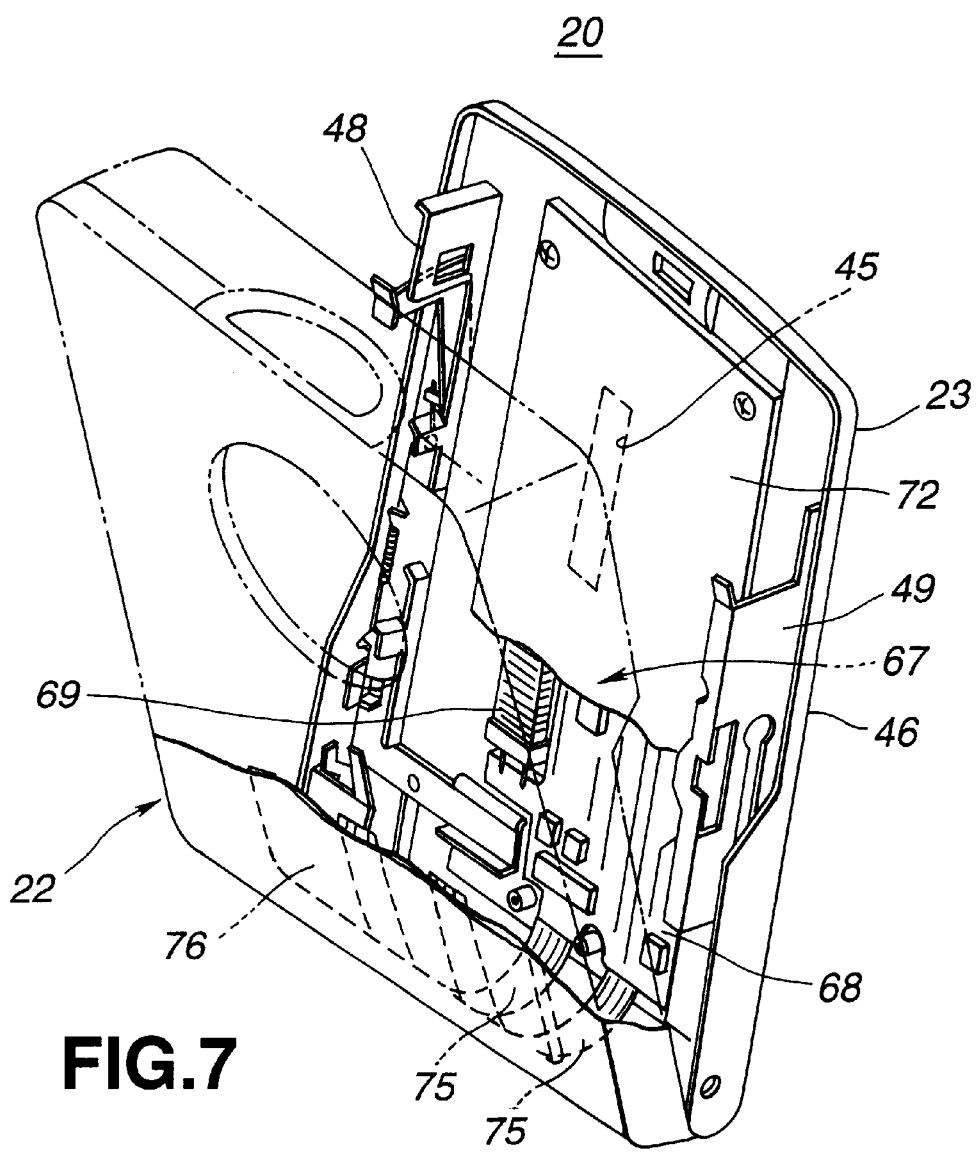
FIG. 7 is a perspective view showing a state in which a printed circuit board, in which a radio receiving circuit is formed, has been mounted on the body of the cover.

As shown in FIG. 7, the radio-receiving portion 67 is structured in such a manner that a film-type flexible circuit board 75 connected to the printed circuit board 68 and arranged to have flexibility is inserted into a hinge mechanism portion between the body 22 and the cover 23. Thus, the flexible circuit board 75 is connected to a printed circuit board 76 provided for the body 22 and having a power supply circuit and an audio output circuit. The radio-receiving portion 67 can be operated by operating the band-selection button 30 of the operation portion 25. Since the radio-receiving portion 67 does not need an operation portion for receiving radio waves which is provided on the outer surface of the cover 23, the cover 23 can variously be designed. Moreover, the operation portion 25 enables the recording and/or reproducing operation and the operation for receiving a radio wave to collectively be performed. Thus, the operability can be improved.

As an antenna for receiving FM waves, a connection cord of a earphone connected to the headphone jack is used as a cord antenna.

Since the cover 23 of the tape player apparatus 20 is provided with the radio-receiving portion 67, the reflecting layer 56 is made of the material having a characteristic through which transmission of radio waves are permitted satisfactorily. As a result of various experiments, titanium (Ti) can be employed as the material exhibiting excellent transmissivity.

Titanium (Ti) is a non-magnetic material having a specific electrical resistance of about $0.48\times10_{-4}$ at ordinary temperature. Since titanium (Ti) can be evaporated, workability can be improved.

As described above, the reflecting layer 56 is made of titanium (Ti) which is a non-magnetic material and which has a high electrical resistance. Therefore, the receiving characteristic of the radio-receiving portion 67 does not deteriorate. Since the body 46 and the closing plate 72 forming the cover 23 made of the synthetic resin have the wave transmissive characteristic, the sensitivity for receiving radio waves do not deteriorate. Therefore, the tape player apparatus 20 having the structure that the radio-receiving portion 67 is provided for the cover 23 enables the size of the overall body of the tape player apparatus 20 to be reduced. Moreover, the cover 23 is made of the material having wave transmissivity so that deterioration in the radio receiving characteristic is prevented.

The tape player apparatus 20 has been described as the recording and/or reproducing apparatus having the radio receiving unit according to the present invention. However, the present invention is not limited to the tape player apparatus 20. As a matter of course, the present invention may be applied to a recording and/or reproducing apparatus, such as a disk player apparatus for recording and/or reproducing a disk cartridge formed in such a manner that a disc-shape recording medium, such as a magneto-optical disk, is accommodated in a cartridge.

Since the recording and/or reproducing apparatus according to the present invention has the structure that the mirror is provided for the cover for closing the loading portion for accommodating a recording medium, a user is urged to want to always carry the recording and/or reproducing apparatus according to the present invention. In particular, a recording and/or reproducing apparatus can be provided on which the face of a female user can be reflected and which has a unique design.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A recording and/or reproducing apparatus comprising:

a body;

a recording and/or reproducing portion housed in said main body for recording and/or reproducing a recording medium;

a lid made of a synthetic resin and rotatably mounted on said body, wherein said lid opens and closes said recording and/or reproducing portion, said lid having an opening; and a reflecting plate provided on an outside surface of said lid and having a coated metal material for permitting transmission of radio waves.

2. A recording and/or reproducing apparatus according to claim 1, wherein a see-through window portion is formed in said reflecting plate so that said recording medium loaded into said recording and/or reproducing portion is observed from outside in a state in which said body is covered with said lid.

3. A recording and/or reproducing apparatus comprising:

a body;

a recording and/or reproducing portion housed in said main body for recording and/or reproducing a recording medium;

a lid made of a synthetic resin and rotatably mounted on said body, wherein said lid opens and closes said recording and/or reproducing portion, said lid having an opening;

a radio receiving portion provided on an inside surface of said lid and having a bar antenna; and a reflecting plate provided on an outside surface of said lid and having a coated metal material for permitting transmission of radio waves.

4. A recording and/or reproducing apparatus according to claim 3, further comprising a see-through window portion formed in said reflecting plate and a through hole formed in said radio receiving portion, enabling said recording medium loaded into said recording and/or reproducing portion to be observed from outside when said body is covered with said lid.

5. A recording and/or reproducing apparatus according to claim 3, wherein said radio-wave transmissive material is titanium (Ti).

6. A recording and/or reproducing apparatus according to claim 3, wherein said reflecting plate comprises a plate member made of a transparent resin material and a metal coating layer, said metal coating layer is formed on the surface of said plate member opposite the outside surface of said lid.

7. A recording and/or reproducing apparatus according to claim 6, wherein said apparatus further comprises a cover plate provided on an inside surface of said lid for covering said radio receiving portion.

8. A recording and/or reproducing apparatus according to claim 3, wherein said main body is made of a metal material.

9. A recording and/or reproducing apparatus according to claim 3, wherein said radio receiving portion comprises a print circuit board and a holder for holding said bar antenna.

* * * * *

UNITED STATES PATENT AND TRADEMARK OFFICE

CERTIFICATE OF CORRECTION

PATENT NO. : 6,271,984 B1
DATED : August 7, 2001
INVENTOR(S) : Taizo Ogawa et al.

It is certified that error appears in the above-identified patent and that said Letters Patent is hereby corrected as shown below:

Column 1,
Line 21, please change "reproduce" to -- reproducing --;
Line 49, please insert -- conveniently -- after "be";
Line 49, please delete "and";
Line 50, please delete "convenient for a female user to carry the apparatus".

Column 4,
Line 16, please change "((not shown)" to -- (not shown) --.

Column 5,
Line 8, please change "Ti)" to -- (Ti) --.

Column 7,
Line 27, please change "$0.48x10_{-4}$" to -- $0.48x10^{-4}$ --.

Signed and Sealed this

Sixth Day of August, 2002

*Attest:*

JAMES E. ROGAN

*Attesting Officer* *Director of the United States Patent and Trademark Office*